(12) United States Patent
Otanicar et al.

(10) Patent No.: US 10,113,777 B2
(45) Date of Patent: Oct. 30, 2018

(54) AMBIENT WATER CONDENSING APPARATUS

(71) Applicant: The University of Tulsa, Tulsa, OK (US)

(72) Inventors: Todd P. Otanicar, Tulsa, OK (US); Jared Starkweather, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 225 days.

(21) Appl. No.: 14/939,713

(22) Filed: Nov. 12, 2015

(65) Prior Publication Data
US 2016/0131401 A1 May 12, 2016

Related U.S. Application Data

(60) Provisional application No. 62/078,705, filed on Nov. 12, 2014.

(51) Int. Cl.
*F25B 21/02* (2006.01)
*E03B 3/28* (2006.01)
(Continued)

(52) U.S. Cl.
CPC ............ *F25B 21/02* (2013.01); *B01D 5/0042* (2013.01); *C02F 1/14* (2013.01); *E03B 3/28* (2013.01); *Y02A 20/211* (2018.01); *Y02A 20/212* (2018.01)

(58) Field of Classification Search
CPC ..... F21B 21/02; B01D 5/0042; B01D 53/265; E93B 3/28
See application file for complete search history.

(56) References Cited

U.S. PATENT DOCUMENTS 5,517,829 A    5/1996   Michael
5,634,342 A    6/1997   Peeters et al.
(Continued)

FOREIGN PATENT DOCUMENTS

JP    2008264749    11/2008
WO    2012073794    6/2012
(Continued)

OTHER PUBLICATIONS

Author: M.A. Munoz-Garcia, et al; Title: Water Harvesting for Young Trees Using Peltier Modules Powered by Photovoltaic Solar Energy by Computers and Electronics in Agriculture 93 (2013) 60-67; journal homepage: www.elsevier.com/locate/compag.
(Continued)

*Primary Examiner* — Elizabeth Martin
(74) *Attorney, Agent, or Firm* — Head, Johnson, Kachigian & Wilkinson, PC

(57) ABSTRACT

An ambient water condensing apparatus that extracts water vapor from ambient air utilizing a thermoelectric device, a superhydrophobic and/or superhydrophilic radiating condensing surface and a heat sink for providing point of source irrigation or drinking water using conventional and/or sustainable energy supplies. The thermoelectric device is thermally coupled intermediate of the condensing surface and the heat sink, and in particular a cold side of the thermoelectric device is thermally connected to the condensing surface and a hot side of the thermoelectric device is thermally connected to the heat sink. The water condensing apparatus may also include at least one fan element that cools the heat sink and introduces additional air to the condensing surface. The thermoelectric device and the fan element may be powered by any suitable electrical energy source, such as by solar energy, wind energy or grid power.

18 Claims, 13 Drawing Sheets

(51) Int. Cl.
*B01D 5/00* (2006.01)
*C02F 1/14* (2006.01)

(56) References Cited

U.S. PATENT DOCUMENTS

| | | | |
|---|---|---|---|
| 5,845,504 | A | 12/1998 | LeBleu |
| 6,058,718 | A | 5/2000 | Forsberg et al. |
| 6,182,453 | B1 | 2/2001 | Forsberg |
| 6,481,232 | B2 | 11/2002 | Faqih |
| 6,574,979 | B2 | 6/2003 | Faqih |
| 6,581,849 | B2 | 6/2003 | Zhang |
| 6,828,499 | B2 | 12/2004 | Max |
| 6,868,690 | B2 | 3/2005 | Faqih |
| 6,893,540 | B2 | 5/2005 | Stout et al. |
| 6,945,063 | B2 | 9/2005 | Max |
| 7,043,934 | B2 | 5/2006 | Radermacher et al. |
| 7,089,763 | B2 | 8/2006 | Forsberg et al. |
| 7,293,420 | B2 | 11/2007 | Max |
| 7,337,615 | B2 | 3/2008 | Reidy |
| 7,373,787 | B2 | 5/2008 | Forsberg et al. |
| 7,467,523 | B2 | 12/2008 | Vetrovec et al. |
| 7,478,535 | B2 | 1/2009 | Turner, Jr. |
| 7,559,204 | B2 | 7/2009 | Hatamian et al. |
| 7,866,176 | B2 | 1/2011 | Vetrovec et al. |
| 7,887,622 | B1 | 2/2011 | Turner, Jr. |
| 7,954,335 | B2 | 6/2011 | Hill et al. |
| 8,448,678 | B2 | 5/2013 | Mitchell |
| 8,464,545 | B2 | 6/2013 | Lutz |
| 8,627,673 | B2 | 1/2014 | Hill et al. |
| 8,875,526 | B1 | 11/2014 | Isaacson |
| 8,943,850 | B2 | 2/2015 | Vandermeulen et al. |
| 2006/0118274 | A1 | 6/2006 | Lee et al. |
| 2006/0288709 | A1* | 12/2006 | Reidy ............ B01D 5/0042 62/3.4 |
| 2007/0261413 | A1 | 11/2007 | Hatamian et al. |
| 2008/0282704 | A1 | 11/2008 | Shalom |
| 2012/0048117 | A1 | 3/2012 | Katzir et al. |
| 2013/0003258 | A1 | 1/2013 | Xie et al. |
| 2013/0118542 | A1* | 5/2013 | Levy ............ H01L 35/32 136/205 |
| 2013/0220906 | A1 | 8/2013 | Stenhouse |
| 2013/0255280 | A1 | 10/2013 | Murphy et al. |
| 2014/0069478 | A1* | 3/2014 | Gauss ............ H01L 35/30 136/210 |
| 2014/0318008 | A1* | 10/2014 | Smith ............ A01G 5/06 47/41.01 |
| 2014/0358023 | A1* | 12/2014 | Davis ............ G01N 33/497 600/543 |
| 2016/0079509 | A1* | 3/2016 | Grayson ............ H01L 35/32 136/238 |

FOREIGN PATENT DOCUMENTS

| | | |
|---|---|---|
| WO | 2013026126 | 2/2013 |
| WO | 2015064781 | 5/2015 |

OTHER PUBLICATIONS

This Bottle Turns Air Into Water As You Ride Your Bike; Huffington Post Nov. 17, 2014 http://www.huffingtonpost.com/2014/11/17/water-from-air-fontus_n_6160136.html.

* cited by examiner

AMBIENT WATER CONDENSING APPARATUS

CROSS REFERENCE TO RELATED APPLICATIONS

This application claims the benefit of and priority to U.S. Provisional Patent Application Ser. No. 62/078,705, entitled HYBRID PASSIVE AND ACTIVE WATER COLLECTOR APPARATUS, filed Nov. 12, 2014, which is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

STATEMENT REGARDING PRIOR DISCLOSURES BY THE INVENTOR OR A JOINT INVENTOR

Not Applicable.

BACKGROUND OF THE INVENTION

1. Field of the Invention

This invention relates generally to an ambient water condensing apparatus, and more particularly to an ambient water condensing apparatus that extracts water vapor from ambient air utilizing a thermoelectric device, a superhydrophobic radiating condensing surface and a heat sink for providing point of source irrigation or drinking water using conventional and/or sustainable energy supplies.

2. Description of the Related Art

Water is a fundamental human need. Each person on Earth requires at least 20 to 50 liters of clean, safe water a day for drinking, cooking, and simply keeping themselves clean. Water is also essential for agriculture and food production for humans and animals.

Despite the great need for water, less than three percent of Earth's water exists as freshwater that is accessible for human use with more than two-thirds of the planet's freshwater being frozen in glaciers and ice caps. Almost the rest of the freshwater is groundwater, which provides a critical water reservoir for agricultural, industrial, and environmental uses as well as for about 25 to 40 percent of the drinking water supply. Generally, transporting water from groundwater sources to where the water is needed involves the installation of pipelines, pumps and water distribution means, all of which require energy and incur costs.

It would be desirable to collect water more proximate to where water is needed so as to reduce energy consumption and costs associated with transporting water and it would also be desirable to increase the water supply in areas where freshwater is scarce.

Water vapor extraction has been an important technology that has been refined and developed in recent years. In a typical water condensing apparatus, ambient air is passed over a cold surface to facilitate condensation of water vapor from the ambient air. The apparatus may also include a water collection tank for receiving the condensed water vapor. In addition, in order to enhance the flow of ambient air within the apparatus, a fan or blower may be incorporated into the apparatus.

More recently, water condensing apparatuses have included the addition and refinement of water and air purification means. For example, in order to ensure that the air quality is at an acceptable level, air filters have been used to remove any air contaminants prior to condensation of water vapor from the ambient air. Water condensing apparatuses may also include various timers and sensors that are responsive to purification filters. The filters, timers and other sensors may enhance the effectiveness of the water condensing apparatus, and may also ensure that the apparatus operates reliably without significant human interaction and oversight.

The various improvements to water condensing apparatus have made a substantial impact in the viability and utility of such apparatuses; however, there remains a continuing need to enhance the efficiency of the water vapor extraction process. Furthermore, there is a need in the art for an economic and effective water condensing apparatus that efficiently utilizes an external energy source. Moreover, there is a need in the art for an improved water condensing apparatus that provides for maximum condensation and extraction of water vapor from the ambient air, which can be subsequently purified for various uses. Lastly, there is a need in the art for an improved water condensing apparatus that provides point of source irrigation or drinking water using conventional and/or sustainable energy supplies.

Other advantages and features will be apparent from the following description, and from the claims.

SUMMARY OF THE INVENTION

In general, in a first aspect, the invention relates to an ambient water condensing apparatus having a thermoelectric device with a hot side and a cold side. A heat sink is thermally connected to the hot side of the thermoelectric device, and the heat sink has a plurality of protruding fin-like surfaces. A condensing surface is thermally connected to the cold side of the thermoelectric device, and the condensing surface also has a plurality of protruding fin-like surfaces. An insulating material surrounds the thermoelectric device and is positioned intermediate of the heat sink and the condensing surface.

The condensing surface may be a superhydrophobic condensing surface, a superhydrophilic condensing surface, or a combination thereof. In addition, the condensing surface may be at least partially covered with a highly conductive metallic base material with a series of nano-patterns forming a superhydrophobic radiating condensing surface, a superhydrophilic radiating condensing surface, or a combination thereof.

The ambient water condensing apparatus may also include a fan element in fluid communication with the heat sink. The fan element is configured to induce a flow of air across the heat sink. Additionally, the ambient water condensing apparatus may have a heat sink cover or a heat sink plate configured to direct the flow of air induced by the fan element across the heat sink. An air flow chamber may be formed intermediate of the heat sink cover and the fin-like surfaces of the heat sink. The fan element can also be in fluid communication with and configured to induce a flow of air across the condensing surface. A condensing surface cover or a condensing surface plate may be configured to direct the flow of air induced by the fan element across the condensing surface. In addition, the fan element may be housed in a fan element housing that is connected to the condensing surface and the heat sink. The ambient water condensing apparatus can also include a plurality of axially aligned apertures in the heat sink, the insulating material and the condensing surface.

In general, in a second aspect, the invention relates to an ambient water condensing apparatus that includes a thermoelectric device having a hot side and a cold side. The hot side of the thermoelectric device is thermally connected to a heat sink, which has a plurality of protruding fin-like surfaces. The cold side of the thermoelectric device is thermally connected to a superhydrophobic condensing surface, which also has a plurality of protruding fin-like surfaces. An insulating material surrounds the thermoelectric device and is positioned intermediate of the heat sink and the superhydrophobic condensing surface. The ambient water condensing apparatus also includes a fan element in fluid communication with the heat sink and configured to induce a flow of air across the heat sink.

The superhydrophobic condensing surface may include a portion configured as a superhydrophilic condensing surface. A heat sink cover or a heat sink plate may be configured to direct the flow of air induced by the fan element across the heat sink. The fan element can also be in fluid communication with and configured to induce a flow of air across the condensing surface. A condensing surface cover or a condensing surface plate may be configured to direct the flow of air induced by the fan element across the condensing surface. In addition, the fan element may be housed in a fan element housing that is connected to the condensing surface and the heat sink. The ambient water condensing apparatus can also include a plurality of axially aligned apertures in the heat sink, the insulating material and the condensing surface.

In general, in a third aspect, the invention relates to an ambient water condensing apparatus having a thermoelectric device with a hot side thermally connected to a porous heat sink and a cold side thermally connected to a porous superhydrophobic condensing surface. The porous heat sink and the porous superhydrophobic condensing surface each respectively include a plurality of protruding fin-like surfaces and a plurality of air flow apertures. An porous insulating material is positioned intermediate of the porous heat sink and the porous superhydrophobic condensing surface and surrounds the thermoelectric device. Like the porous heat sink and the porous superhydrophobic condensing surface, the porous insulating material includes a plurality of air flow apertures. The ambient water condensing apparatus further includes a fan element in fluid communication with the porous heat sink and the porous superhydrophobic condensing surface. The fan element is configured to induce a flow of air across the porous heat sink and the porous superhydrophobic condensing surface and to induce the flow of air through the axially aligned air flow apertures of the porous heat sink, the porous insulating material and the porous superhydrophobic condensing surface.

DETAILED DESCRIPTION OF THE INVENTION

Figure 1:
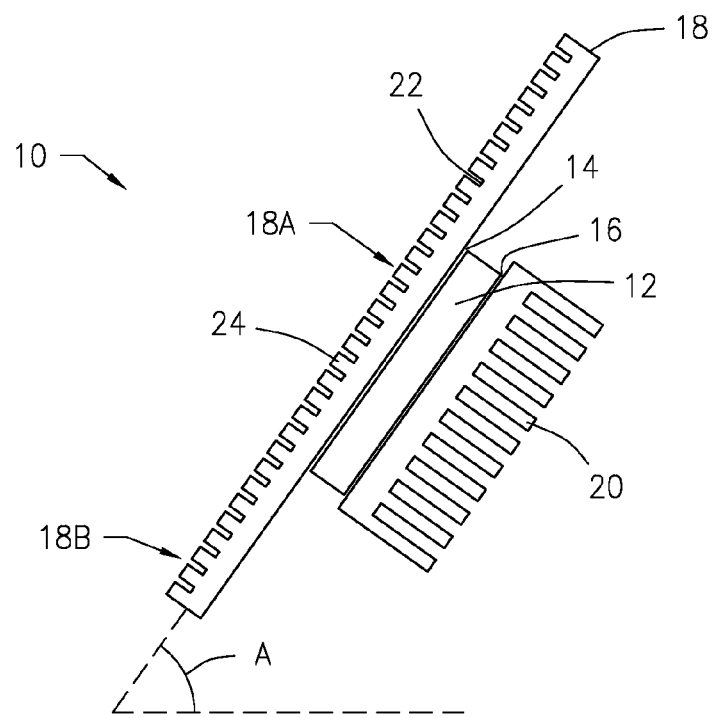
FIG. 1 is a side plan view of an example of a water condensing apparatus in accordance with an illustrative embodiment of the invention disclosed herein.

The apparatuses and methods discussed herein are merely illustrative of specific manners in which to make and use this invention and are not to be interpreted as limiting in scope.

While the invention has been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

The description of the invention is intended to be read in connection with the accompanying drawings, which are to be considered part of the entire written description of this invention. In the description, relative terms such as "front," "rear," "lower," "upper," "horizontal," "vertical," "above," "below," "up," "down," "top" and "bottom" as well as derivatives thereof (e.g., "horizontally," "downwardly," "upwardly" etc.) should be construed to refer to the orientation as then described or as shown in the drawings under discussion. These relative terms are for convenience of description and do not require that the machine be constructed or the method to be operated in a particular orientation. Terms, such as "connected," "connecting," "attached," "attaching," "join" and "joining" are used interchangeably and refer to one structure or surface being secured to another structure or surface or integrally fabricated in one piece.

Figure 2:
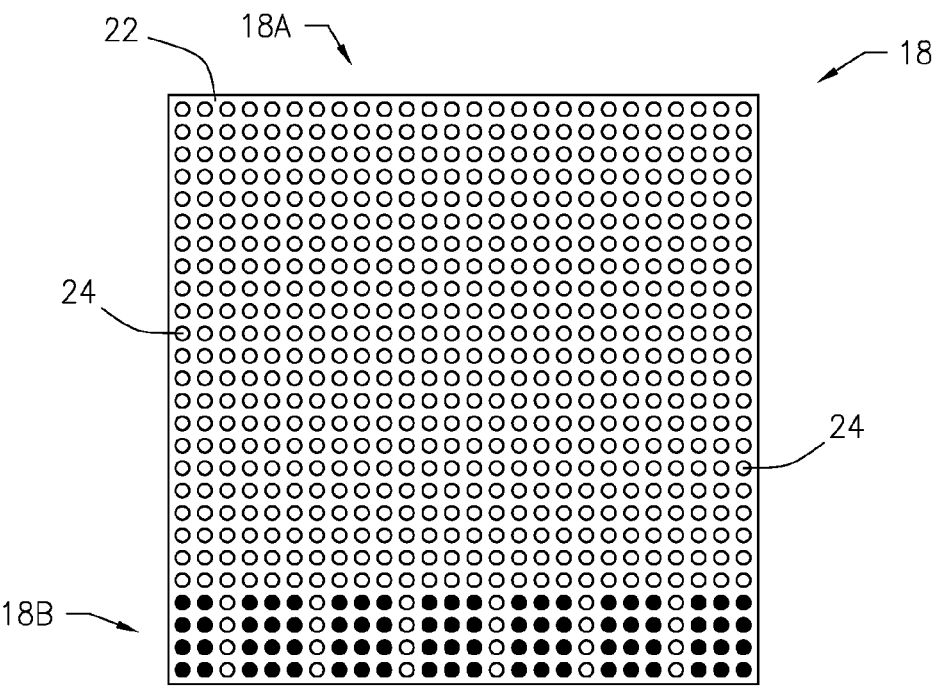
FIG. 2 is a top plan view of the water condensing apparatus shown in FIG. 1.

Referring to the figures of the drawings, wherein like numerals of reference designate like elements throughout the several views, and initially to FIGS. 1 and 2, an ambient water condensing apparatus 10 that extracts water vapor from ambient air. The apparatus 10 includes a Peltier thermoelectric device 12 having a cold side 14 that is thermally connected to a condensing surface 18. A hot side 16 of the thermoelectric device 12 is thermally connected to a heat sink 20 and cooled by the atmospheric air. The thermoelectric device 12 may be powered by any suitable electrical energy source, such as by solar energy, wind energy or grid power.

In the exemplary embodiment of the water condensing apparatus 10 illustrated FIGS. 1 and 2, the condensing surface 18 includes a superhydrophilic radiating condensing surface 18A and a superhydrophobic radiating condensing surface 18B. The condensing surface 18 may be covered with a highly conductive metallic base material 22, such as a metal, metal alloy, electrolyte, superconductor, semiconductor, plasma, graphite or conductive polymer. The base material 22 may be coated with an oxide, polymeric, ceramic, mineral or metallic material to form a series of nano-patterns 24 on the condensing surface 18. While the nano-patterns 24 are illustrated in FIG. 2 as alternating pattern of dots or circular areas, the water condensing apparatus 10 is not so limited and it will be appreciated that other forms of nano-patterns may be employed, such as channels or pits.

The superhydrophilic radiating condensing surface 18A enhances the ability of the water condensing apparatus 10 to capture water from the ambient air while also enhancing the solar reflectance. Additionally, the superhydrophobic radiating surface 18B enhances drainage of the condensed water from the condensing surface 18, while also providing the radiative cooling benefit. The use of a superhydrophilic coating on the condensing surface 18 results in increased condensate formation but limits condensate drainage and heat transfer effectiveness, but when nano-patterns 24 are designed with surrounding superhydrophobic surfaces the effective heat transfer and condensate drainage are increased. The superhydrophobic coating for the superhydrophobic radiating surface 18B may be prepared according to known methods for making superhydrophobic materials, such as forming flat surface arrays of vertically aligned PTFE coated carbon nanotubes, forming periodic arrays of pillars on a flat surface using microelectronics based photolithography, using self-aligned polymer nanospheres, or using porous or roughened fluorinated polymers as a superhydrophobic coating material.

As exemplified in FIG. 1, the water condensing apparatus 10 is configured at an acute angle A to the ground. By way of a non-limiting example, the water condensing apparatus 10 may be positioned at angle A between 40 and 60 degrees relative to the ground. In addition, during operation, the condensing surface 18 may be positioned facing away from direct sunlight during the daytime in order to minimize heating while, at the same time, facing the sky during the nighttime in order to promote radiative cooling of the water condensing apparatus 10.

Figure 3:
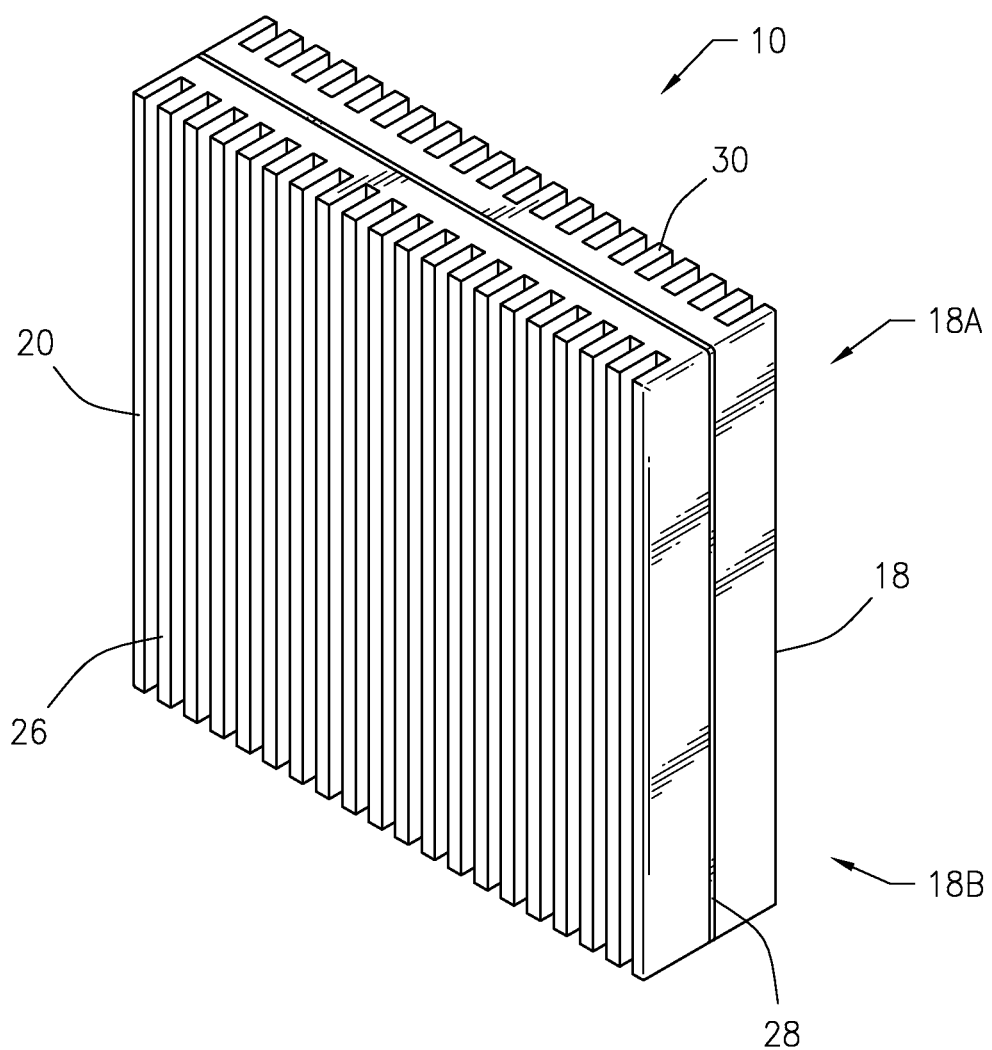
FIG. 3 is an isometric view of an example of a water condensing apparatus in accordance with another illustrative embodiment of the invention disclosed herein.
Figure 4:
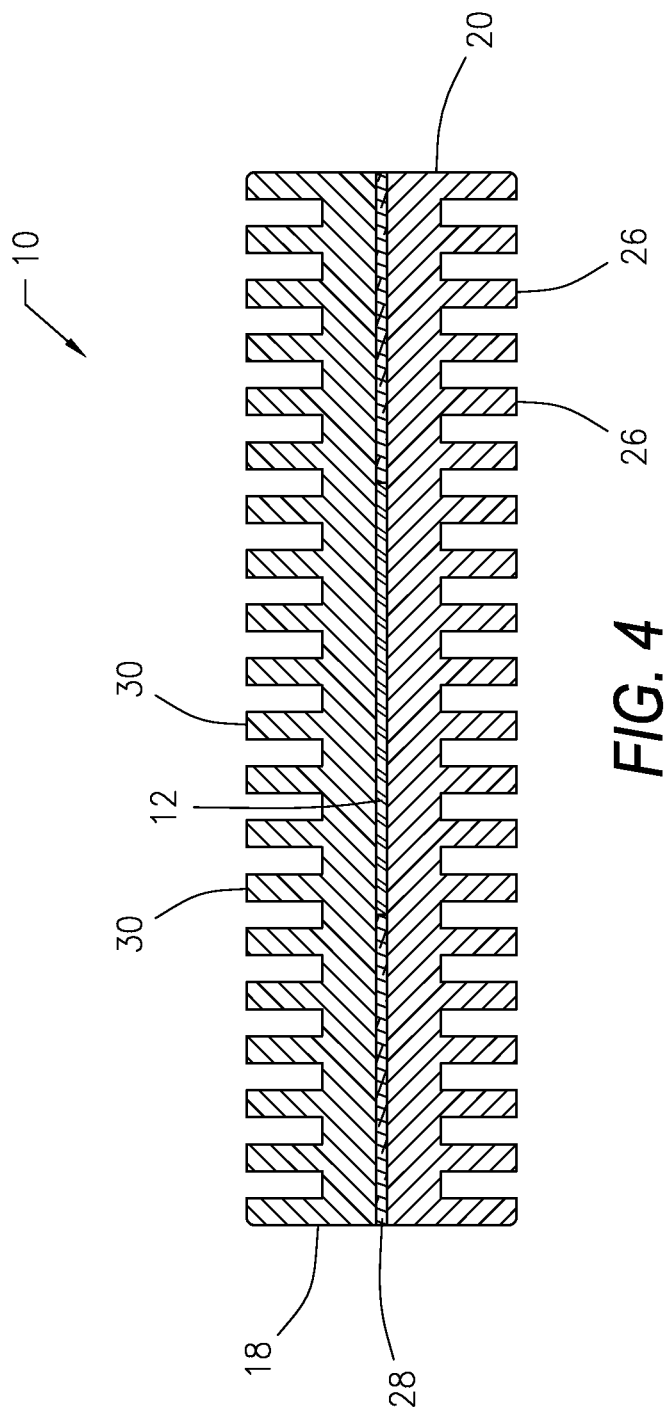
FIG. 4 is a top plan view of the exemplary water condensing apparatus shown in FIG. 3.
Figure 5:
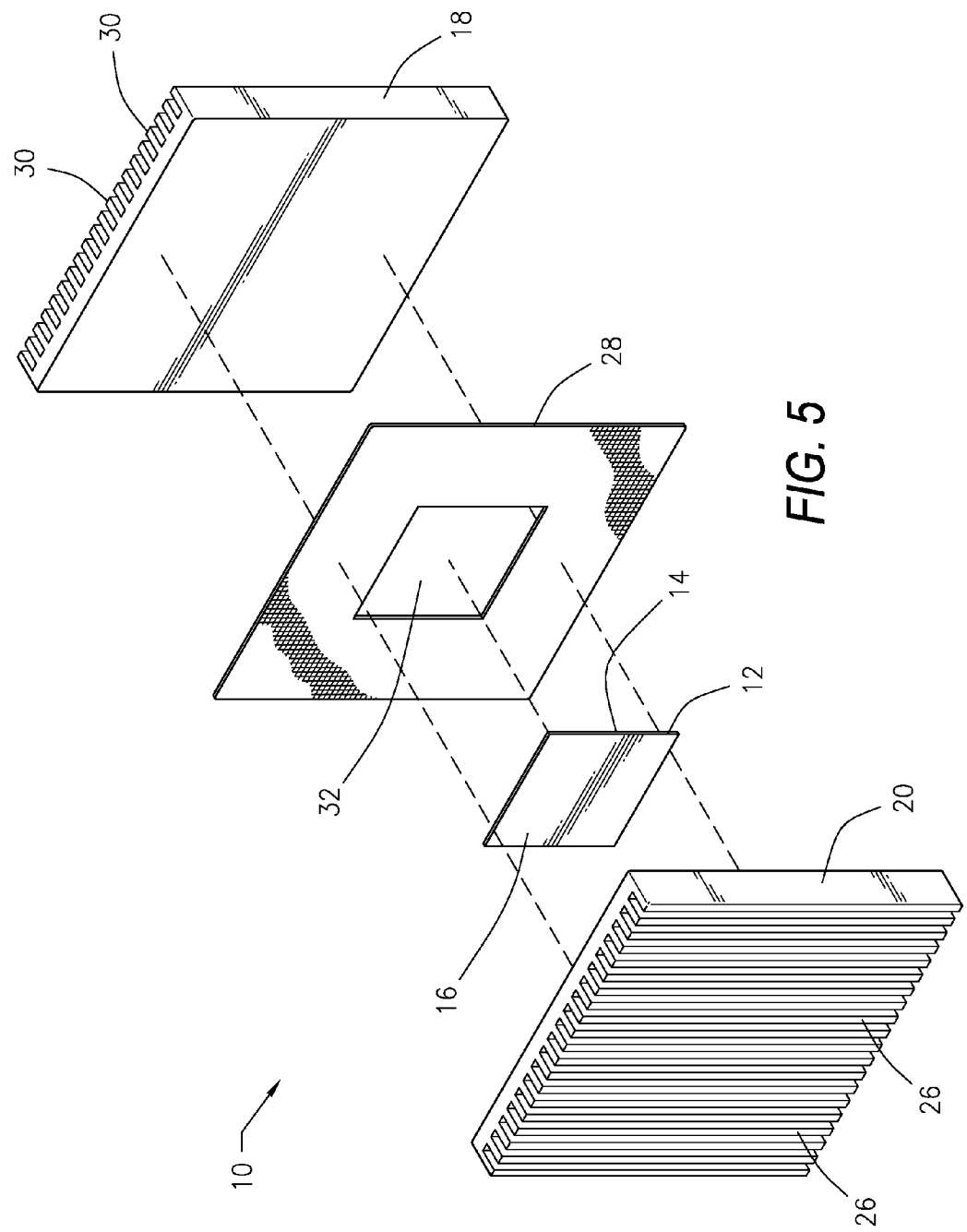
FIG. 5 is an exploded perspective view of the exemplary water condensing apparatus shown in FIG. 3.

Turning now to FIGS. 3 through 5, the water condensing apparatus 10 is exemplified with the heat sink 20 having one or more fin-like surfaces 26 for enhanced heat mass transfer. The heat sink 20 is left exposed to the open air, enabling the heat sink 20 to be cooled by a convectively induced air flow. Similar to above, the hot side 16 of the thermoelectric device 12 is thermally connected to the heat sink 20, while the cold side 14 of the thermoelectric device 12 is thermally connected to the condensing surface 18. In this exemplary embodiment of the invention, the thermoelectric device 12 is surrounded by and may be seated within an aperture 32 of a layer of insulating material 28 to prevent reverse heat flow from the heat sink 20 to the condensing surface 18. The insulating material 28 may be constructed of polystyrene, polyisocyanurate, or polyurethane. Power is provided to the thermoelectric device 12 from solar panels, wind energy or grid power. The condensing surface 18 may include a superhydrophilic radiating condensing surface 18A, a superhydrophobic radiating condensing surface 18B or a combination of both. The condensing surface 18 includes one or more fin-like surfaces 30, which are left exposed to the open air, allowing the condensing surface 18 to contact ambient air and condense the water vapor present.

Figure 6:
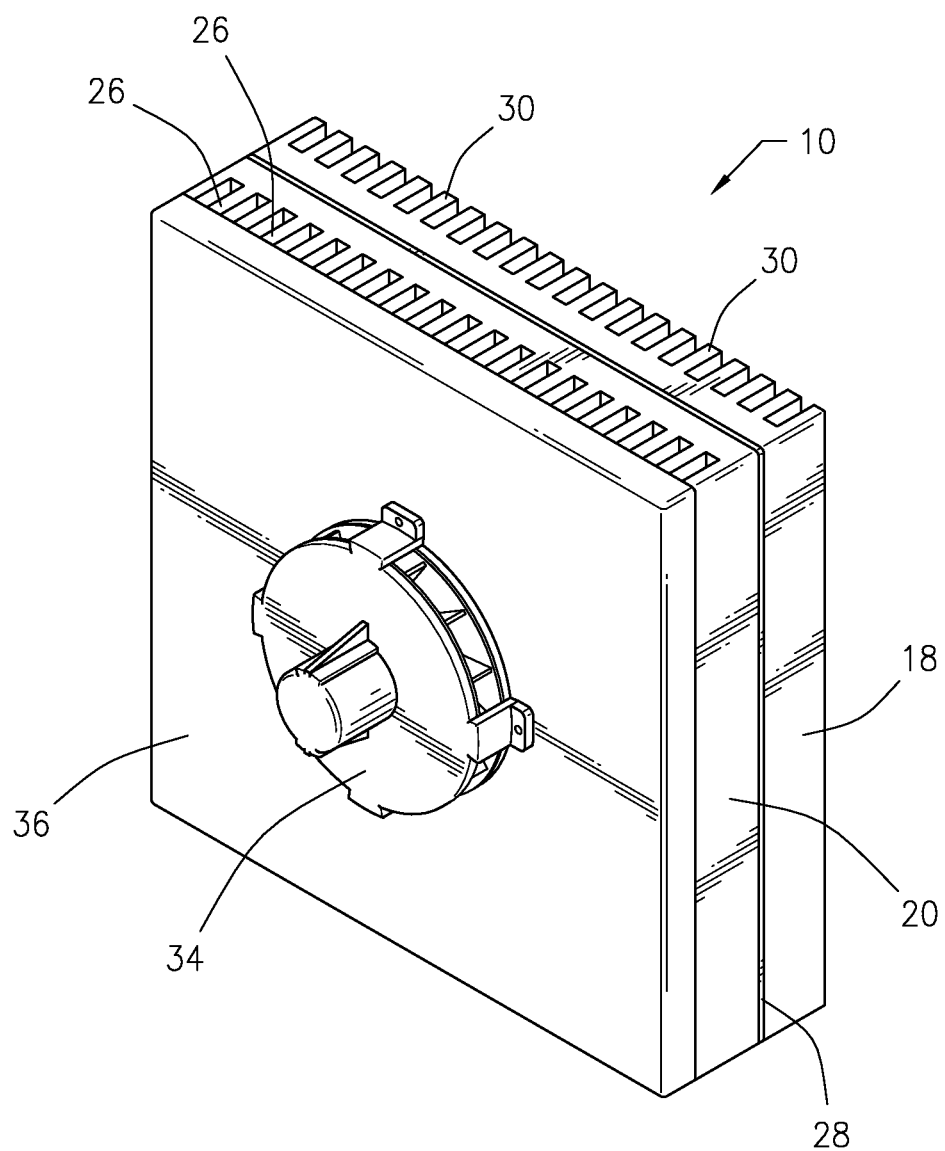
FIG. 6 is an isometric view of an example of a water condensing apparatus in accordance with another illustrative embodiment of the invention disclosed herein.
Figure 7:
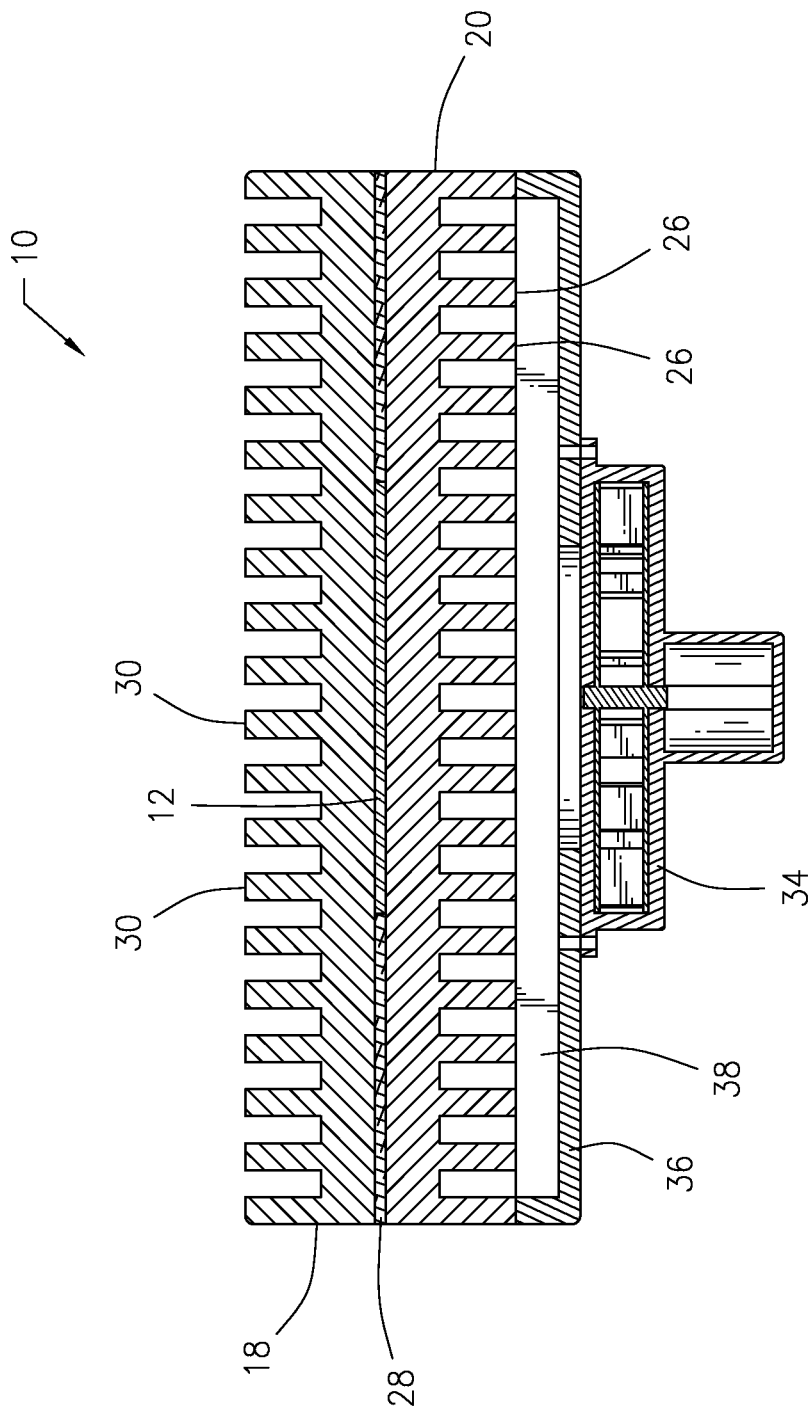
FIG. 7 is a top plan view of the exemplary water condensing apparatus shown in FIG. 6.
Figure 8:
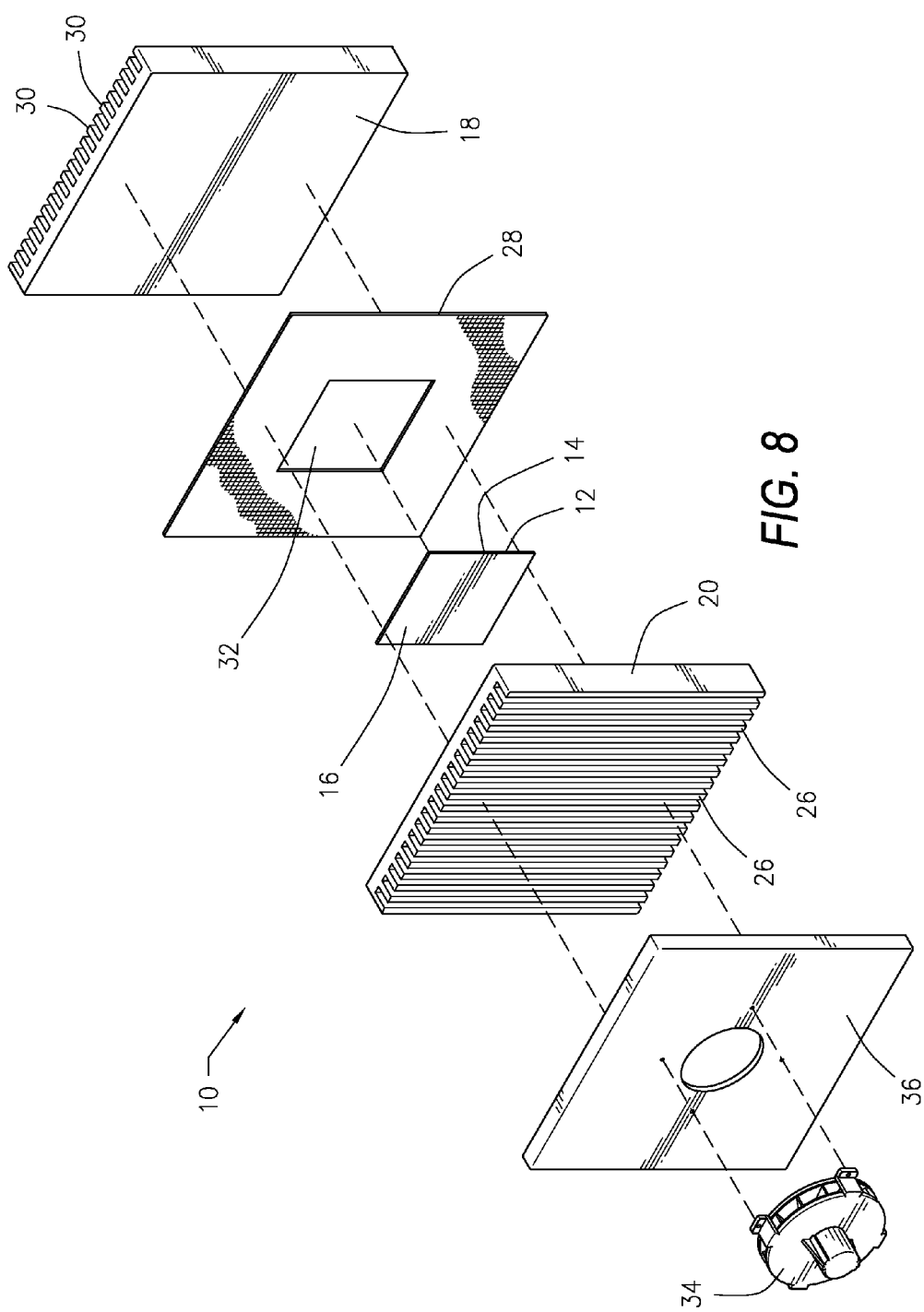
FIG. 8 is an exploded perspective view of the exemplary water condensing apparatus shown in FIG. 6.

FIGS. 6 through 8 show yet another embodiment of the ambient water condensing apparatus 10 provided herein. In this illustrative embodiment, a fan element 34 is in fluid communication with the heat sink 20 and a heat sink cover 36 directs the flow of air induced by the fan element 34 directly across the heat sink 20. An air flow chamber 38 is formed intermediate of the heat sink cover 36 and the fin-like surfaces 30 of the heat sink 20 in order to cool the heat sink 20 by forced convection instead of natural convection induced by the heat sink 20. The increased flow of air increases the heat transfer out of the heat sink 20, lowers the temperature of the heat sink 20, and therefore increases the efficiency of the thermoelectric device 12. The heat sink cover 36 leaves only the top and bottom of the heat sink 20 exposed to the open air, allowing for the fan element 34 to force air through the fin-like surfaces 30 that protrude from the heat sink 20.

Figure 9:
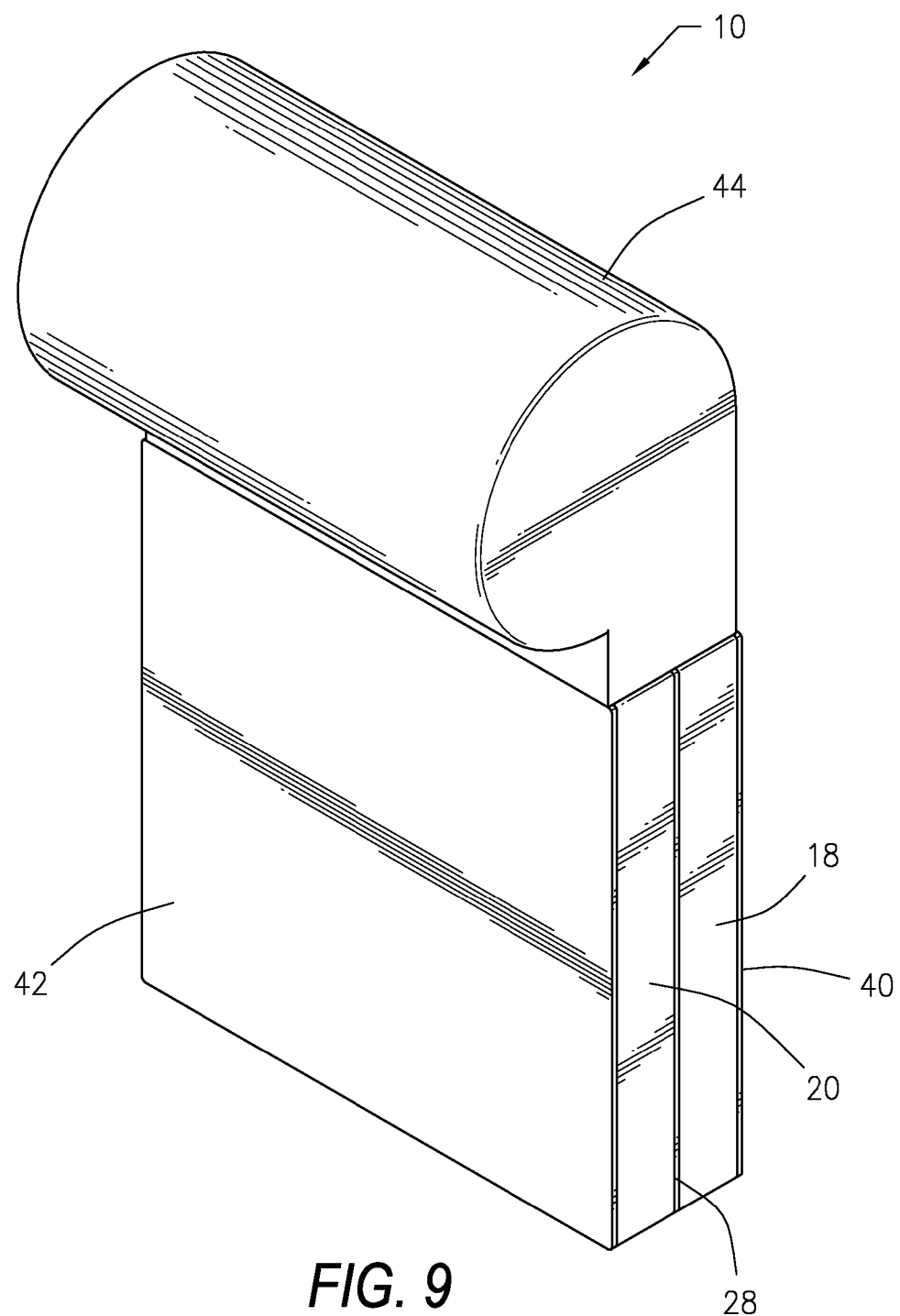
FIG. 9 is an isometric view of an example of a water condensing apparatus in accordance with another illustrative embodiment of the invention disclosed herein.
Figure 10:
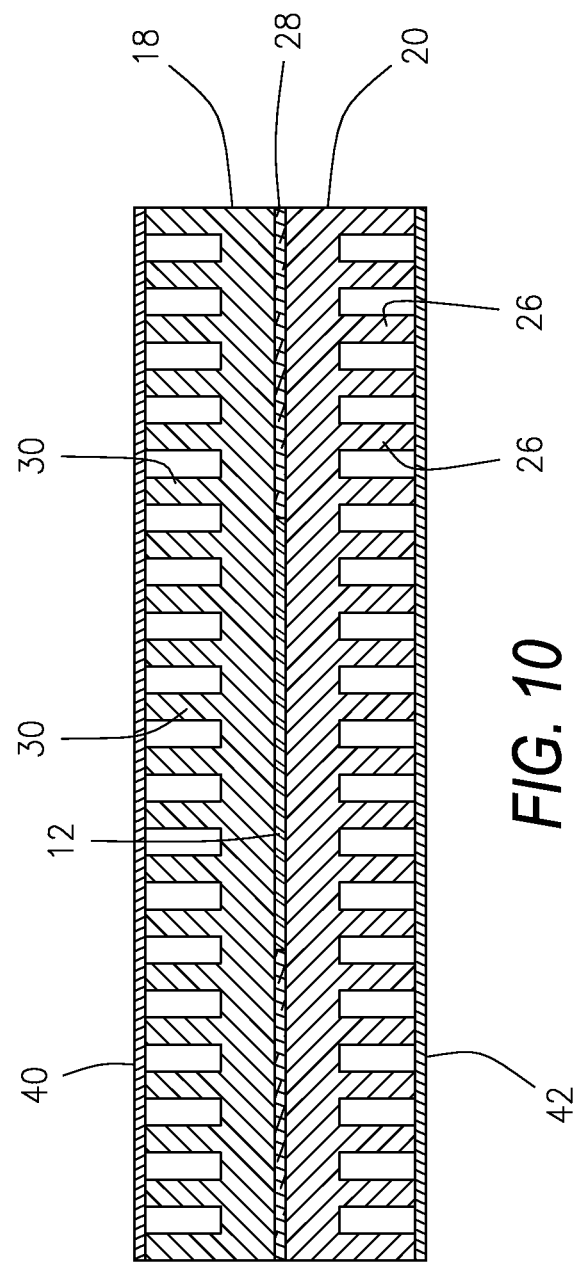
FIG. 10 is a top plan view of the exemplary water condensing apparatus shown in FIG. 9.
Figure 11:
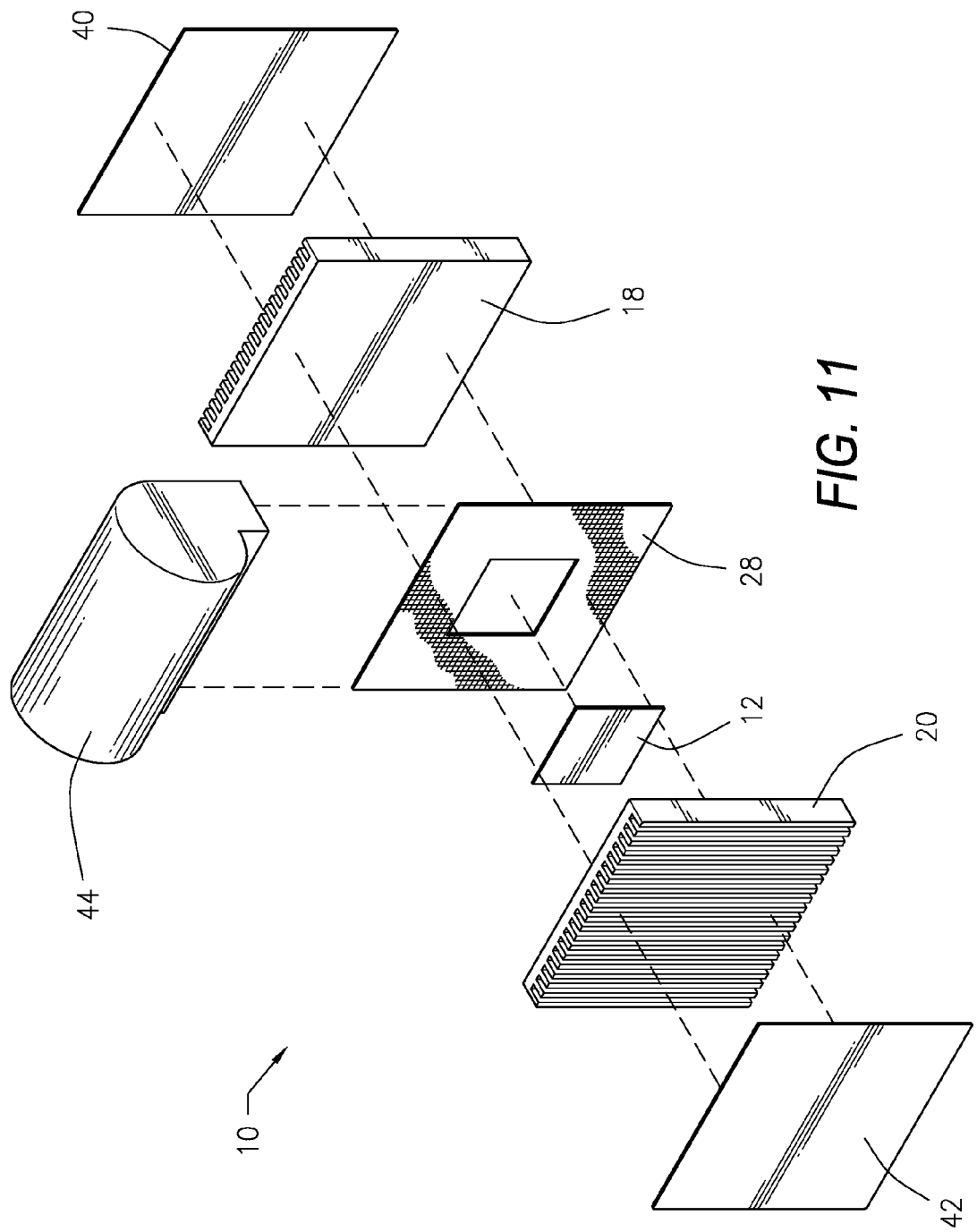
FIG. 11 is an exploded perspective view of the exemplary water condensing apparatus shown in FIG. 9.

FIGS. 9 through 11 illustrate the ambient water condensing apparatus 10 with a condensing surface plate 40 attached to and covering the condensing surface 18 and a heat sink plate 42 attached to and covering the heat sink 20. In this embodiment, the condensing surface plate 40 and the heat sink plate 42 leave the bottom of the condensing surface 18 and the heat sink 20 exposed to the open air. The top of the condensing surface 18 and the heat sink 20 are in fluid communication with the fan element 34, which is positioned within a fan element housing 44 that is connected to the top of the condensing surface plate 40 and the heat sink plate 42. The condensing surface plate 40, the heat sink plate 42, and the fan element 34 induces an air flow across both the heat sink 20 and the condensing surface 18. The fan element 34 both cools the heat sink 20 and introduces additional air to the condensing surface 18, increasing the vapor exposure, therefore increasing the condensate flow rate of the water condensing apparatus 10.

Figure 12:
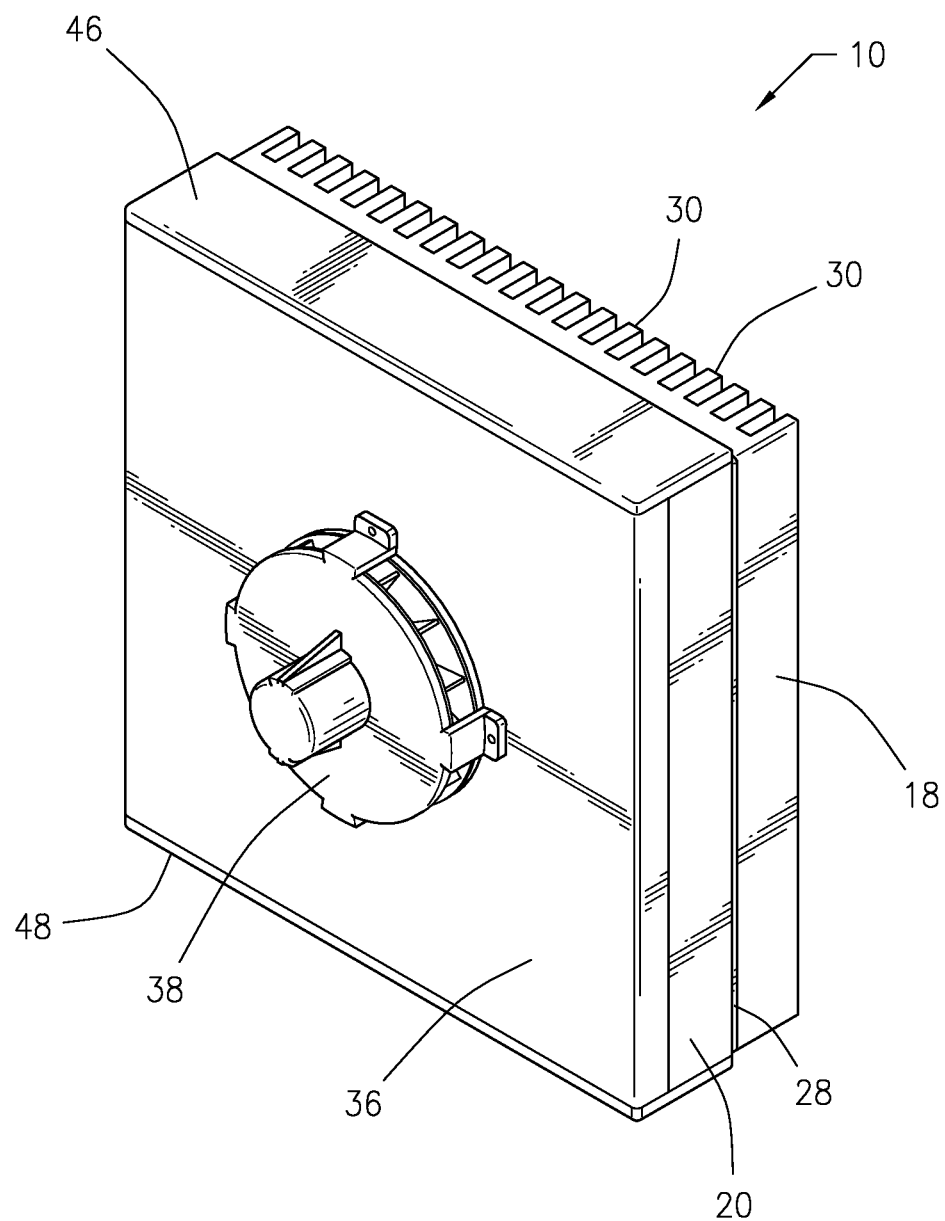
FIG. 12 is an isometric view of an example of a water condensing apparatus in accordance with another illustrative embodiment of the invention disclosed herein.
Figure 13:
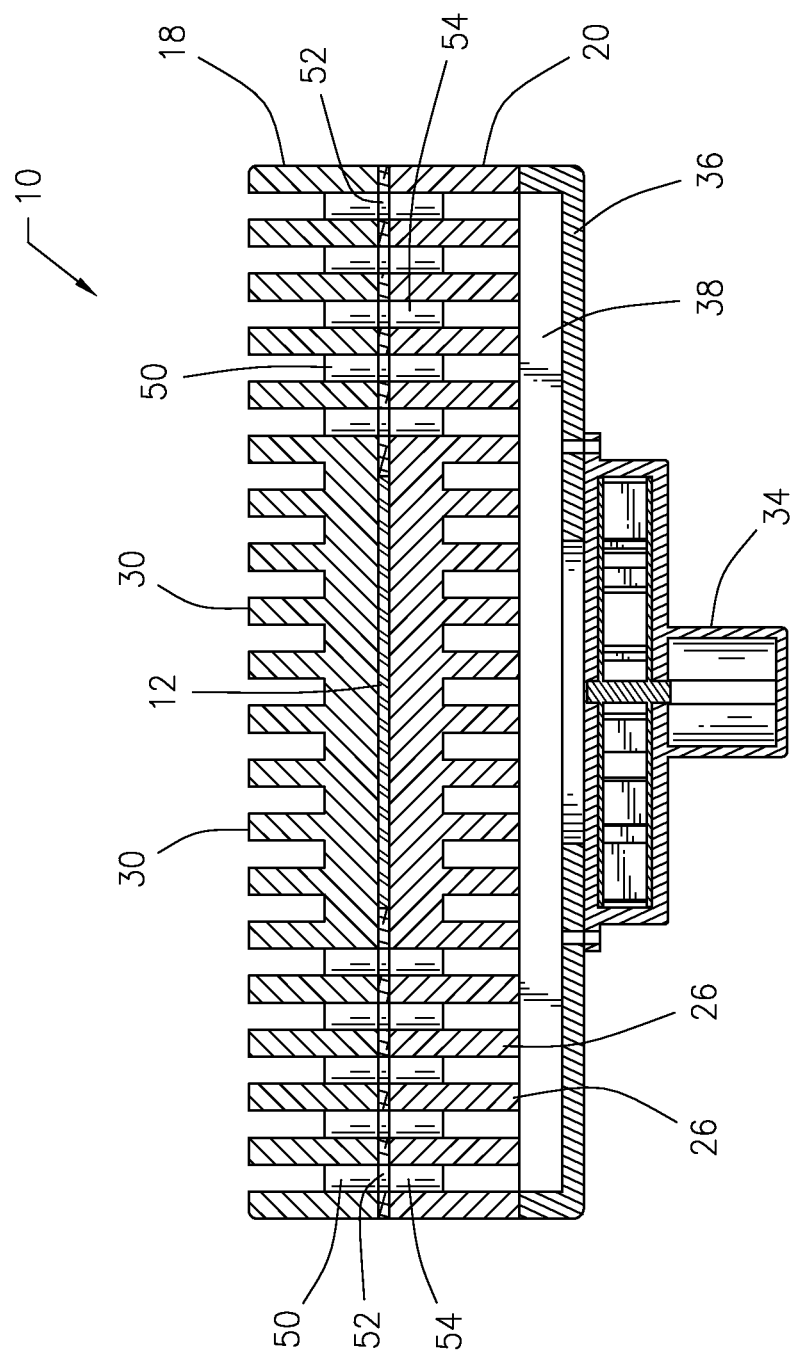
FIG. 13 is a top plan view of the exemplary water condensing apparatus shown in FIG. 12.
Figure 14:
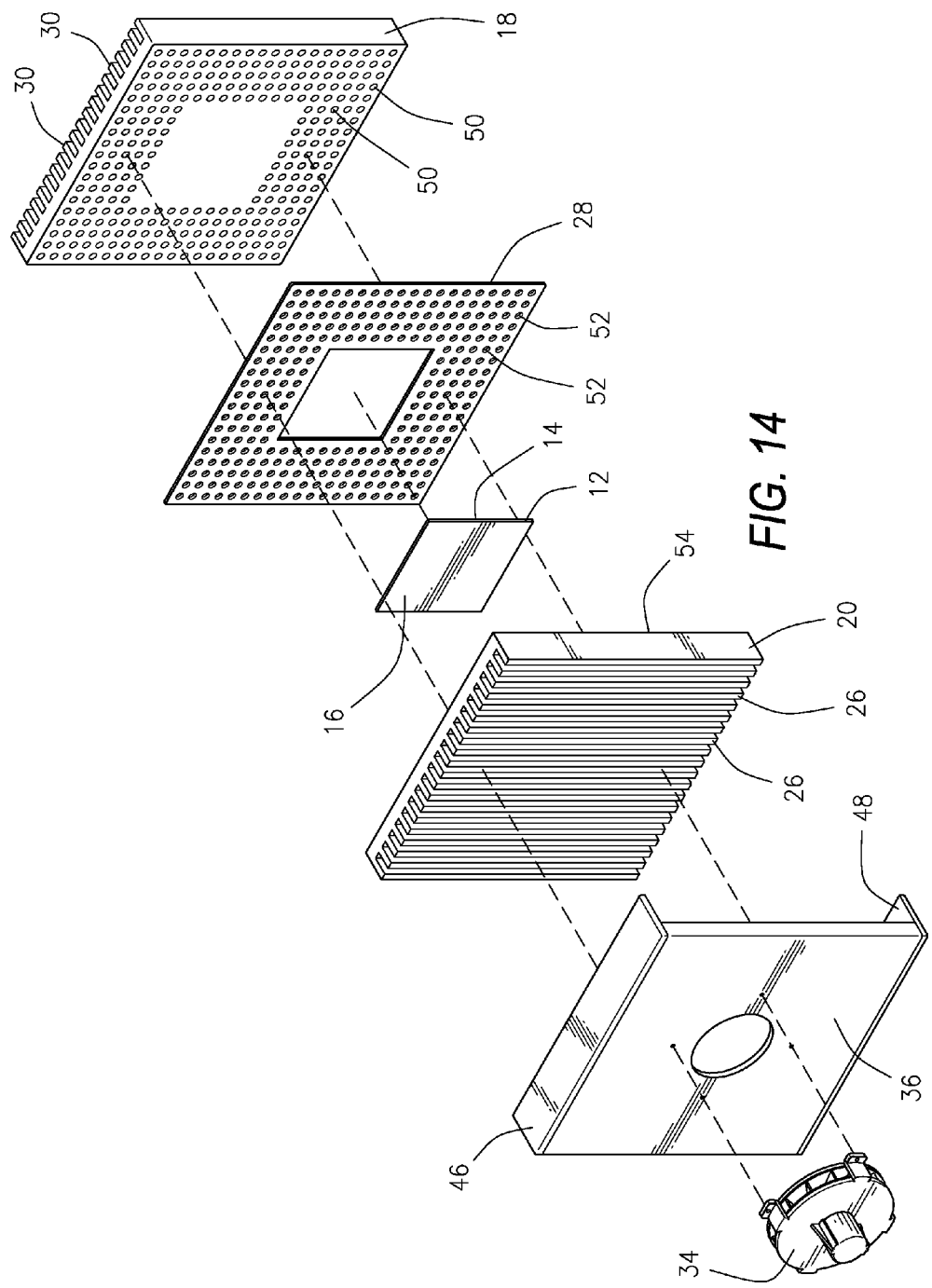
FIG. 14 is an exploded perspective view of the exemplary water condensing apparatus shown in FIG. 12.

Turning now to FIGS. 12 through 14, in this non-limiting embodiment of the water condensing apparatus 10, the heat sink cover 36 completely covers the heat sink 20, such as by using a top cap 46 and a bottom cap 48, encloses the air flow chamber 38 unlike the embodiment illustrated in FIGS. 6 through 8. The heat sink 20, the insulation layer 28, and the condensing surface 18 have axially aligned apertures 50, 52 and 54. The apertures 50 of the heat sink 20 and the apertures 54 of the condensing surface 18 are positioned in between the fin-like structures 26 and 30, respectively. The fan element 34 is attached to the heat sink cover 36 and pulls air from the condensing surface 18, through the apertures 54 of the condensing surface 18, through the apertures 52 in the insulating material 28, and through the apertures 54 in the heat sink 20. This configuration of the ambient water condensing apparatus 10 enables the cool, dry air coming off of the condensing surface 18 to pass over and through the heat sink 20, increasing the temperature difference between the heat sink 20 and the air passing over it, therefore increasing the heat transfer from the heat sink 20.

Whereas, the apparatuses and methods have been described in relation to the drawings and claims, it should be understood that other and further modifications, apart from those shown or suggested herein, may be made within the spirit and scope of this invention.

What is claimed is:

1. An ambient water condensing apparatus, comprising:
a thermoelectric device having a hot side and a cold side;
a heat sink thermally connected to said hot side of said thermoelectric device, said heat sink having a plurality of protruding fin-like surfaces;
a water condensing surface thermally connected to said cold side of said thermoelectric device, said water condensing surface having a plurality of protruding fin-like surfaces wherein said fin-like surfaces of said water condensing surface comprise a superhydrophobic condensing surface, a superhydrophilic condensing surface, or a combination thereof; and
an insulating material surrounding said thermoelectric device, said insulating material positioned intermediate of said heat sink and said water condensing surface.

2. The apparatus of claim 1 wherein said condensing surface is at least partially covered with a highly conductive metallic base material.

3. The apparatus of claim 2 wherein said condensing surface further comprises a series of nano-patterns.

4. The apparatus of claim 2 wherein said condensing surface comprises a superhydrophobic radiating condensing surface, a superhydrophilic radiating condensing surface, or a combination thereof.

5. The apparatus of claim 1 further comprising a fan element in fluid communication with said heat sink, said fan element configured to induce a flow of air across said heat sink.

6. The apparatus of claim 5 further comprising a heat sink cover or a heat sink plate configured to direct said flow of air induced by said fan element across said heat sink.

7. The apparatus of claim 6 further comprising an air flow chamber intermediate of said heat sink cover and said fin-like surfaces of said heat sink.

8. The apparatus of claim 5 further comprising said fan element in fluid communication with said condensing surface, said fan element configured to induce a flow of air across said condensing surface.

9. The apparatus of claim 8 further comprising a condensing surface cover or a condensing surface plate configured to direct said flow of air induced by said fan element across said condensing surface.

10. The apparatus of claim 8 further comprising a fan element housing connected to said condensing surface and said heat sink.

11. The apparatus of claim 1 further comprising a plurality of axially aligned apertures in said heat sink, said insulating material and said condensing surface.

12. An ambient water condensing apparatus, comprising:
a thermoelectric device having a hot side and a cold side;
a heat sink thermally connected to said hot side of said thermoelectric device, said heat sink having a plurality of protruding fin-like surfaces;
a superhydrophobic water condensing surface thermally connected to said cold side of said thermoelectric device, said superhydrophobic water condensing surface having a plurality of protruding fin-like superhydrophobic water condensing surfaces;
an insulating material surrounding said thermoelectric device, said insulating material positioned intermediate of said heat sink and said superhydrophobic water condensing surface; and
a fan element in fluid communication with said heat sink, said fan element configured to induce a flow of air across said heat sink.

13. The apparatus of claim 12 wherein said superhydrophobic condensing surface further comprises a superhydrophilic condensing surface.

14. The apparatus of claim 12 further comprising a heat sink cover or a heat sink plate configured to direct said flow of air induced by said fan element across said heat sink.

15. The apparatus of claim 12 further comprising said fan element in fluid communication with said superhydrophobic condensing surface, said fan element configured to induce a flow of air across said superhydrophobic condensing surface.

16. The apparatus of claim 15 further comprising a superhydrophobic condensing surface cover or a superhydrophobic condensing surface plate configured to direct said flow of air induced by said fan element across said superhydrophobic condensing surface.

17. The apparatus of claim 15 further comprising a fan element housing connected to said superhydrophobic condensing surface and said heat sink.

18. The apparatus of claim 12 further comprising a plurality of axially aligned apertures in said heat sink, said insulating material and said superhydrophobic condensing surface.

* * * * *